United States Patent
Wong et al.

(10) Patent No.: US 8,174,453 B2
(45) Date of Patent: May 8, 2012

(54) FOLDER-TYPE MOBILE COMMUNICATION DEVICE

(75) Inventors: Kin-Lu Wong, Taipei Hsien (TW);
Chao-An Lyu, Taipei Hsien (TW);
Cheng-Tse Lee, Taipei Hsien (TW)

(73) Assignee: Acer Inc., Taipei Hsien (TW)

( * ) Notice: Subject to any disclaimer, the term of this patent is extended or adjusted under 35 U.S.C. 154(b) by 259 days.

(21) Appl. No.: 12/726,388

(22) Filed: Mar. 18, 2010

(65) Prior Publication Data
US 2011/0156970 A1 Jun. 30, 2011

(30) Foreign Application Priority Data
Dec. 24, 2009 (TW) ................................ 98144822 A

(51) Int. Cl.
*H01Q 1/24* (2006.01)
*H01Q 1/48* (2006.01)
(52) U.S. Cl. ...................... 343/722; 343/702; 343/846
(58) Field of Classification Search .................. 343/702, 343/722, 846, 700 MS
See application file for complete search history.

(56) References Cited

U.S. PATENT DOCUMENTS
7,199,762 B2 * 4/2007 Liu et al. ........................ 343/702
2008/0100514 A1 * 5/2008 Abdul-Gaffoor et al. ..... 343/702
2010/0007563 A1 * 1/2010 Varjonen ........................ 343/702
2010/0309063 A1 * 12/2010 Wong et al. .................... 343/702
* cited by examiner

*Primary Examiner* — Jacob Y Choi
*Assistant Examiner* — Hasan Islam
(74) *Attorney, Agent, or Firm* — Alan Kamrath; Kamrath IP Lawfirm, PA

(57) ABSTRACT

The present invention is related to a folder-type mobile communication device. The device comprises a first dielectric substrate, a first ground plane disposed on the first dielectric substrate, a second dielectric substrate, a second ground plane disposed on the second dielectric substrate, an antenna element, a metal line, and a band-stop circuit. The antenna element is located near the first ground plane and is electrically connected to a source on the first dielectric substrate. The second ground plane is electrically connected to the first ground plane through the metal line. The band-stop circuit is located either on the first ground plane or on the second ground plane. The band-stop circuit includes a slit, a capacitive element, and an inductive element. The slit is near the metal line. The capacitive element is electrically connected to the two sides of the slit, and the inductive element is electrically connected to the two sides of the slit such that the inductive element and the capacitive element form a parallel LC resonant circuit. Therefore, the band-stop circuit generates a parallel resonance at a specified frequency.

10 Claims, 5 Drawing Sheets

1

FOLDER-TYPE MOBILE COMMUNICATION DEVICE

BACKGROUND OF THE INVENTION

1. Field of the Invention

The present invention relates to a folder-type mobile communication device; more particularly, the present invention relates to a folder-type mobile communication device with a band-stop circuit capable of reducing the influence of a system ground plane on its built-in antenna.

2. Description of the Related Art

In recent years, with the fast development of mobile communication technology, mobile communication devices have become essential and irreplaceable in daily life. With the incremental increases in demands for digital audio/video functions, the screen size of the mobile communication device is getting bigger. Therefore, the application development is not only focused on bar-type mobile communication devices, but also on folder-type mobile communication devices.

Because the system ground plane of a bar-type mobile phone antenna is significantly different from that of a folder-type mobile phone antenna, there is generally a need to design different types of antennas, so as to make both the folder-type mobile phone and the bar-type mobile phone respectively meet the requirements of a specific communication system standard. If the bar-type mobile phone antenna is directly used as the folder-type mobile phone antenna, the overall efficiency of the mobile phone antenna will be lowered due to the change of the system ground plane.

U.S. Pat. No. 7,199,762 B2 (Wireless device with distributed load) discloses a technique for improving the influence on a mobile communication device antenna caused by the change of a system ground plane. It discloses that both capacitive coupling and inductive coupling are generated between two system ground planes of a folder-type mobile communication device at the same time. However, the above function can only be achieved by means of utilizing two connection devices to connect to two system ground planes, which invariably increases the complexity of the overall design of the folder-type mobile communication device, as well as increasing its manufacturing cost.

Therefore, there is a need to provide a folder-type mobile communication device to mitigate and/or obviate the aforementioned problems.

SUMMARY OF THE INVENTION

It is an object of the present invention to provide a folder-type mobile communication device, wherein only one connection device (i.e., including a band-stop circuit and a metal line, which will be described hereinafter) is required between two system ground planes. Further, an antenna design (i.e., including an antenna element, a signal source, a first ground plane, and a first dielectric substrate, which will be described hereinafter) used in an bar-type mobile communication device can be directly used in the folder-type mobile communication device of the present invention, such that the characteristics of the antenna used in the folder-type mobile communication device are similar to those of the antenna originally used in the bar-type mobile communication device.

To achieve the abovementioned object, the folder-type mobile communication device of the present invention comprises: a first dielectric substrate; a first ground plane, disposed on a surface of the first dielectric substrate; an antenna element, located near the first ground plane, and electrically connected to a signal source on the first dielectric substrate; a second dielectric substrate; a second ground plane, disposed on a surface of the second dielectric substrate; a metal line, wherein the second ground plane is electrically connected to the first ground plane through the metal line; and a band-stop circuit, located either on the first ground plane or on the second ground plane. The band-stop circuit includes: a slit, located near the metal line; a capacitive element, arranged across the slit, wherein two ends of the capacitive element are respectively electrically connected to two sides of the slit; and an inductive element, arranged across the slit, wherein two ends of the inductive element are respectively electrically connected to two sides of the slit, such that the inductive element and the capacitive element form a parallel LC resonant circuit, and the band-stop circuit generates a parallel resonance at a specified frequency.

According to one embodiment of the present invention, the specified frequency is at about 900 MHz.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
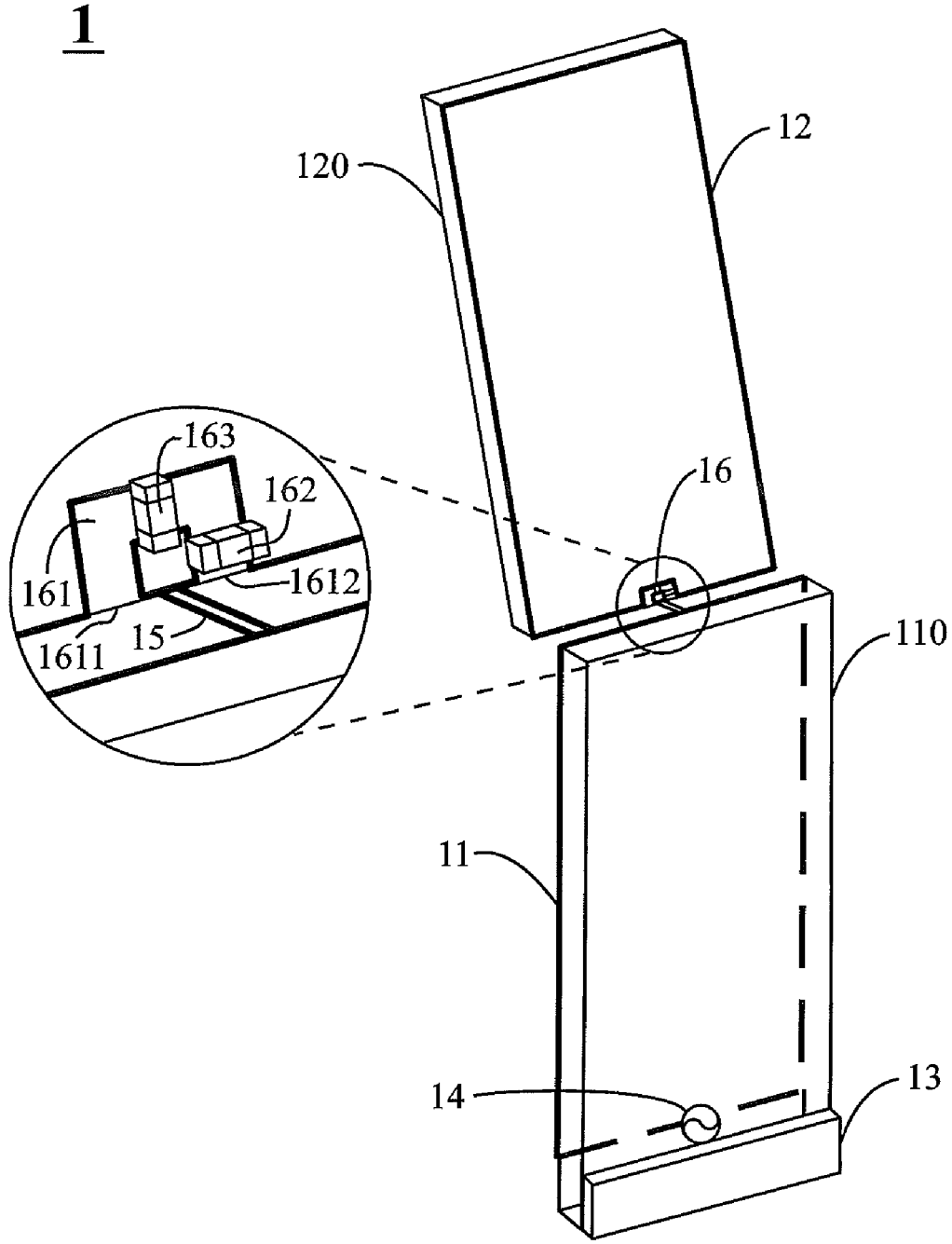
FIG. 1 illustrates a structural view of a folder-type mobile communication device in a first embodiment of the present invention.

Please refer to FIG. 1, which illustrates a structural view of a folder-type mobile communication device in a first embodiment of the present invention. The folder-type mobile communication device 1 comprises a first dielectric substrate 110, a first ground plane 11, an antenna element 13, a second dielectric substrate 120, a second ground plane 12, a metal line 15, and a band-stop circuit 16.

The first ground plane 11 is disposed on a surface of the first dielectric substrate 110. The antenna element 13 is located near the first ground plane 11, and the antenna element 13 is electrically connected to a signal source 14 on the first dielectric substrate 110. The second ground plane 12 is disposed on a surface of the second dielectric substrate 120, and the second ground plane 12 is electrically connected to the first ground plane 11 through the metal line 15.

The band-stop circuit 16 is located on the second ground plane 12. In this embodiment, the band-stop circuit 16 is located on one side of the second ground plane 12, wherein the side is close to the first ground plane 11. The band-stop circuit 16 includes a slit 161, a capacitive element 162, and an inductive element 163.

In this embodiment, the slit 161 is located near the metal line 15, and the slit 161 is U-shaped with a first open end 1611 and a second open end 1612.

The slit 161 is used for avoiding unnecessary short circuiting between the first ground plane 11 and the second ground plane 12, wherein the first ground plane 11, the band-stop circuit 16, and the second ground plane 12 form a direct electrical series connection, such that the band-stop circuit 16 can function properly. Therefore, it is necessary that the shape of the slit 161 is capable of avoiding the direct electrical series connection between the first ground plane 11 and the second ground plane 12. The width of the slit 161 can be adjusted according to the size of the band-stop circuit 16. Preferably, the slit 161 should not be located too far from an end portion of the first ground plane 11, since the farther the distance, the less significant the effect of the folder-type mobile communication device 1.

The capacitive element 162 is a chip capacitor, which is arranged across the slit 161, and two ends of the capacitive element 162 are respectively electrically connected to two sides of the slit 161. The inductive element 163 is a chip inductor, which is also arranged across the slit 161, and two ends of the inductive element 163 are respectively electrically connected to two sides of the slit 161. Therefore, the inductive element 163 and the capacitive element 162 form a parallel LC resonant circuit, such that the band-stop circuit 16 generates a parallel resonance at a specified frequency. In this embodiment, the specified frequency is at about 900 MHz.

With regard to the antenna design of a general mobile phone, when the mobile phone operates in the frequency band of GSM850/900 (824~960 MHz), the overall radiation characteristics of the antenna are prone to being affected due to length variations of system ground planes. Therefore, if the antenna design of a bar-type mobile phone is directly used as that of a folder-type mobile phone, the overall impedance matching of the antenna will be lowered due to the length variations of the system ground planes. As a result, the antenna cannot achieve a standard 6-dB return loss within the frequency band. Therefore, in the present invention, according to the characteristic that the resonant center frequency of the band-stop circuit 16 has high impedance, if the resonant frequency of the band-stop circuit 16 is designed to be at about 900 MHz, a surface current excited on the second ground plane 12 by the antenna element 13 (when located near the first ground plane 11) of the folder-type mobile phone can be significantly reduced. Therefore, the influence of the second ground plane 12 on the overall efficiency of the antenna element 13 of the folder-type mobile phone can be significantly reduced accordingly.

With regard to a higher frequency band, such as GSM1800/1900/UMTS (1710~2170 MHz), the operating wavelength is relatively short, so generally, the surface current is accumulated in the first ground plane 11. Therefore, the influence of the second ground plane 12 on the overall efficiency of the antenna element 13 of the folder-type mobile phone is quite small. According to the above description, the folder-type mobile communication device 1 of the present invention can directly use the antenna design of a general bar-type mobile phone; therefore, the present invention is very practical.

Figure 2:
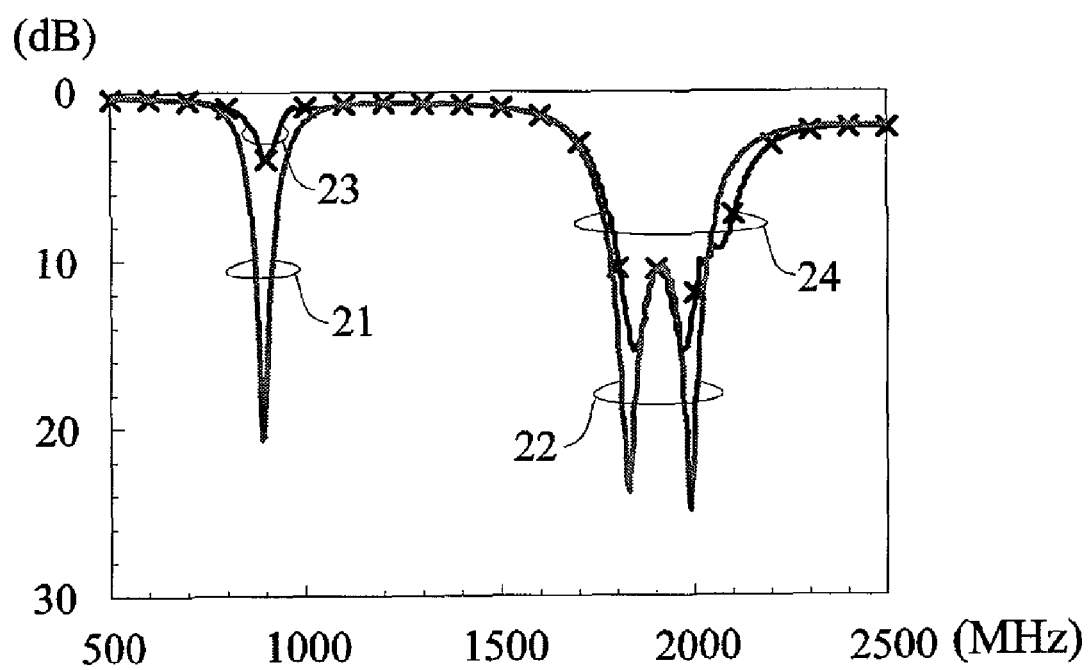
FIG. 2 illustrates a diagram of a return loss of the mobile communication device in the first embodiment of the present invention.

Please refer to FIG. 2, which illustrates a diagram of a return loss of the mobile communication device in the first embodiment of the present invention. In FIG. 2, the vertical axis represents the return loss, and the horizontal axis represents the operating frequency. In the first embodiment, the following parameters are chosen to conduct the measurement: the size of the first ground plane 11 is about 100×60 mm$^2$, and is disposed on a glass fiber dielectric substrate (i.e., the first dielectric substrate 110) with a thickness of about 0.8 mm; the antenna element 13 employs an antenna design used in a bar-type mobile phone, wherein the antenna element 13 can cover GSM850/900/1800/1900/UTMS operations; the size of the second ground plane 12 is about 100×60 mm$^2$, and is disposed on a glass fiber dielectric substrate (i.e. the second dielectric substrate 120) with a thickness of about 0.4 mm; the slit 161 of the band-stop circuit 16 is about 5 mm in length and 1.5 mm in width; the capacitive element 162 is a chip capacitor with a capacitance of about 2.7 pF; and the inductive element 163 is a chip inductor with an inductance of about 3.3 nH.

From the experimental results, with the definition of 6-dB return loss, in the first embodiment, a first operating mode 21 at 900 MHz and a second operating mode 22 at 1800 MHz can cover WWAN (GSM850/900/1800/1900/UMTS) operations of the antenna design of the folder-type mobile phone. If there is no band-stop circuit in the first embodiment, then in a first operating mode 23 at 900 MHz, because there are length variations of system ground planes, the radiation characteristics of the antenna element 13 will be affected in the frequency band of GSM850/900. Therefore, in the frequency band of GSM850/900, the bandwidth of the antenna is significantly reduced and the impedance matching of the antenna is lowered. If there is no band-stop circuit in the first embodiment, then in a second operating mode 24 at 1800 MHz, because the operating wavelength is relatively short, the influence of the second ground plane 12 on the antenna element 13 is quite small. Therefore, the bandwidth and the impedance matching can still meet the definition of 6-dB return loss.

Figure 3:
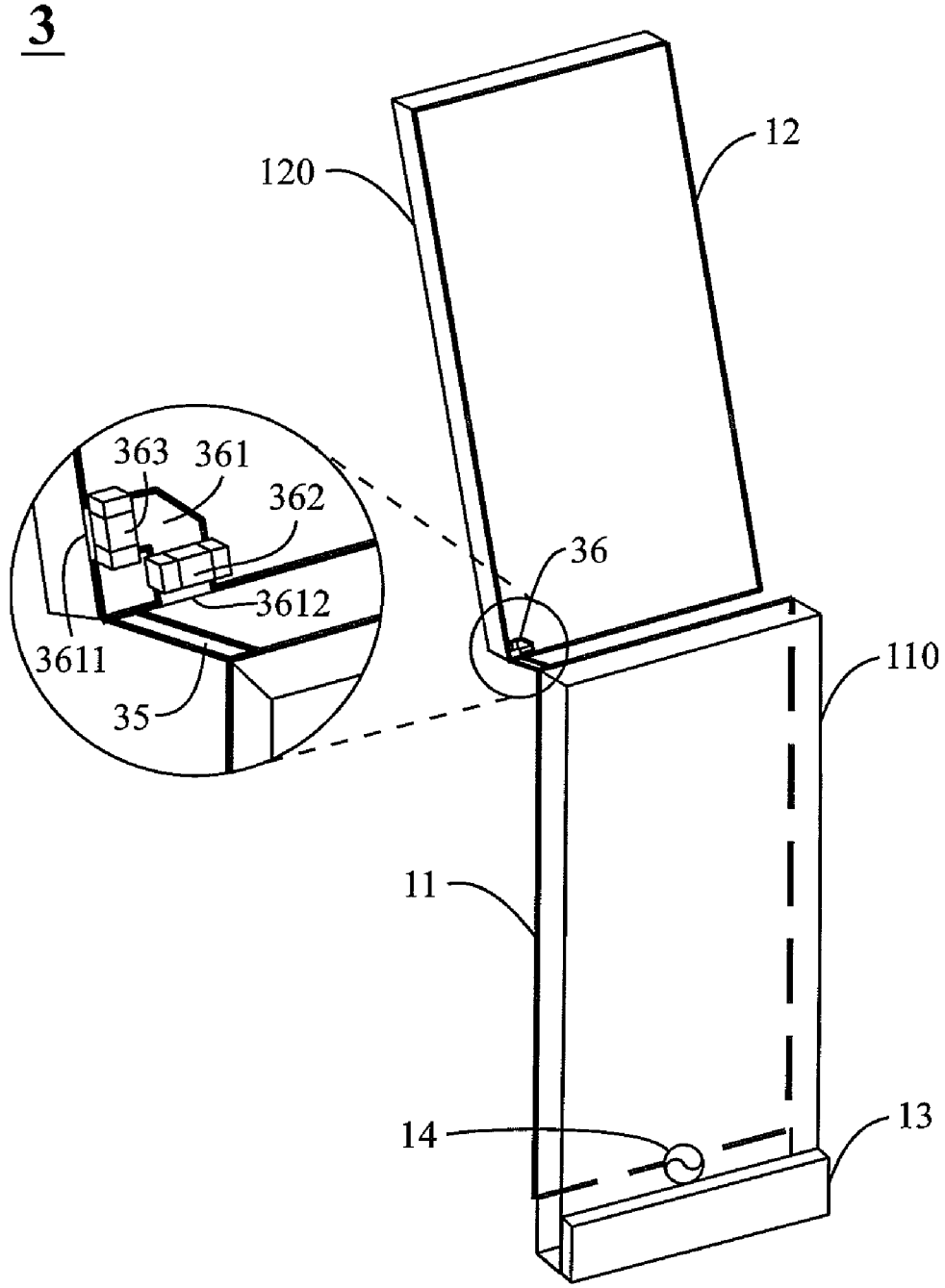
FIG. 3 illustrates a structural view of a folder-type mobile communication device in a second embodiment of the present invention.

Please refer to FIG. 3, which illustrates a structural view of a folder-type mobile communication device in a second embodiment of the present invention. The folder-type mobile communication device 3 comprises a first dielectric substrate 110, a first ground plane 11, an antenna element 13, a second dielectric substrate 120, a second ground plane 12, a metal line 35, and a band-stop circuit 36.

The major differences between the structure of the folder-type mobile communication device 3 of the second embodiment and that of the first embodiment are as follows: The metal line 35 and the band-stop circuit 36 are located on one corner of the second ground plane 12; and the slit 361 is approximately L-shaped with a first open end 3611 and a second open end 3612. The effect of the second embodiment is similar to that of the first embodiment. Therefore, the second embodiment is also capable of generating results similar to those of the first embodiment.

Figure 4:
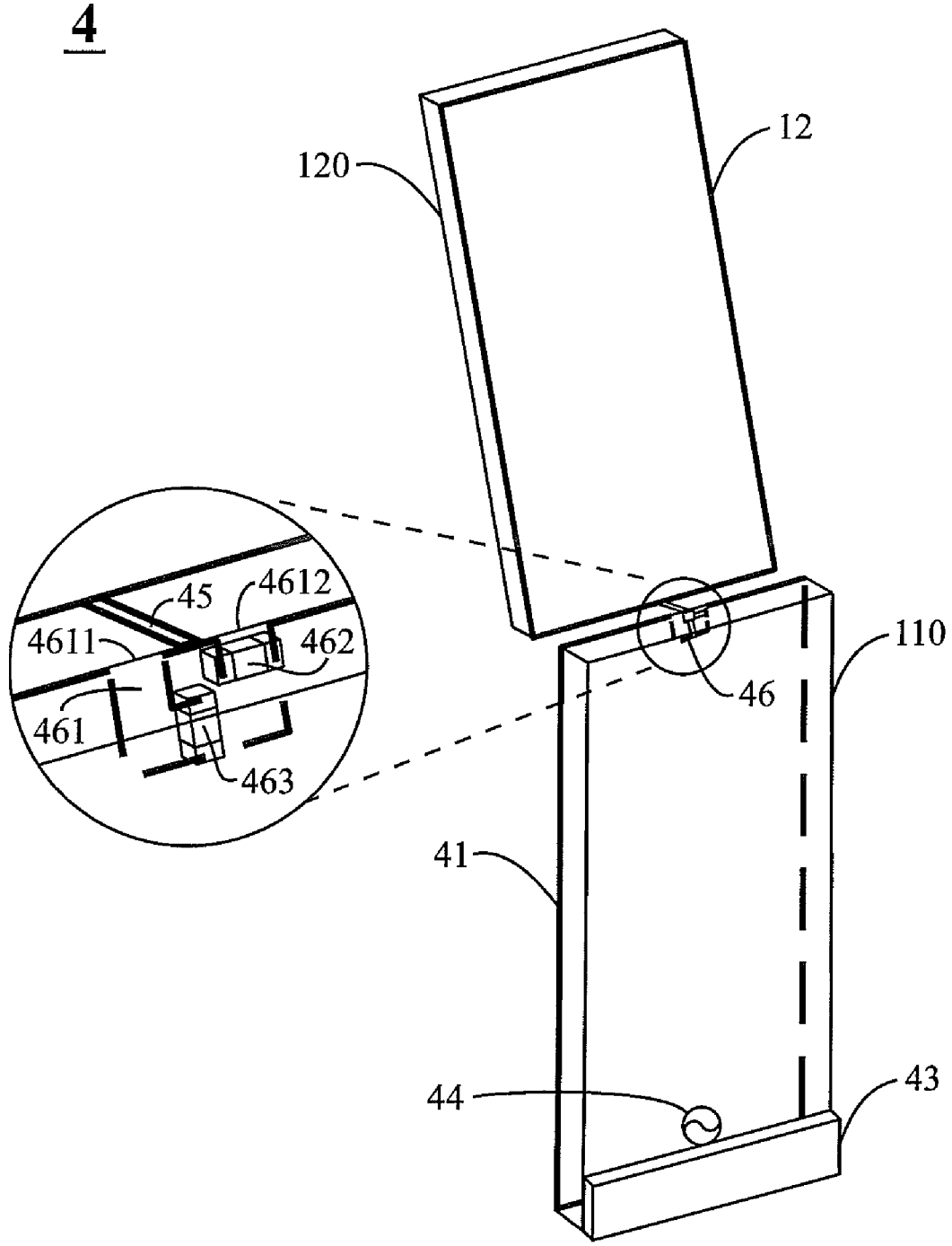
FIG. 4 illustrates a structural view of a folder-type mobile communication device in a third embodiment of the present invention.

Please refer to FIG. 4, which illustrates a structural view of a folder-type mobile communication device in a third embodiment of the present invention. The folder-type mobile communication device 4 comprises a first dielectric substrate 110, a first ground plane 41, an antenna element 43, a second dielectric substrate 120, a second ground plane 12, a metal line 45, and a band-stop circuit 46.

The major differences between the structure of the folder-type mobile communication device 4 of the third embodiment and that of the first embodiment are as follows: The antenna element 43 is located on the first ground plane 41; and the metal line 45 and the band-stop circuit 46 are located on the first ground plane 41. More precisely, the band-stop circuit 46 is located on one side of the first ground plane 41, wherein the side is close to the second ground plane 12. Further, the slit 461 is approximately U-shaped, with a first open end 4611 and a second open end 4612. The effect of the third embodiment is similar to that of the first embodiment. Therefore, the third embodiment is also capable of generating results similar to those of the first embodiment.

Figure 5:
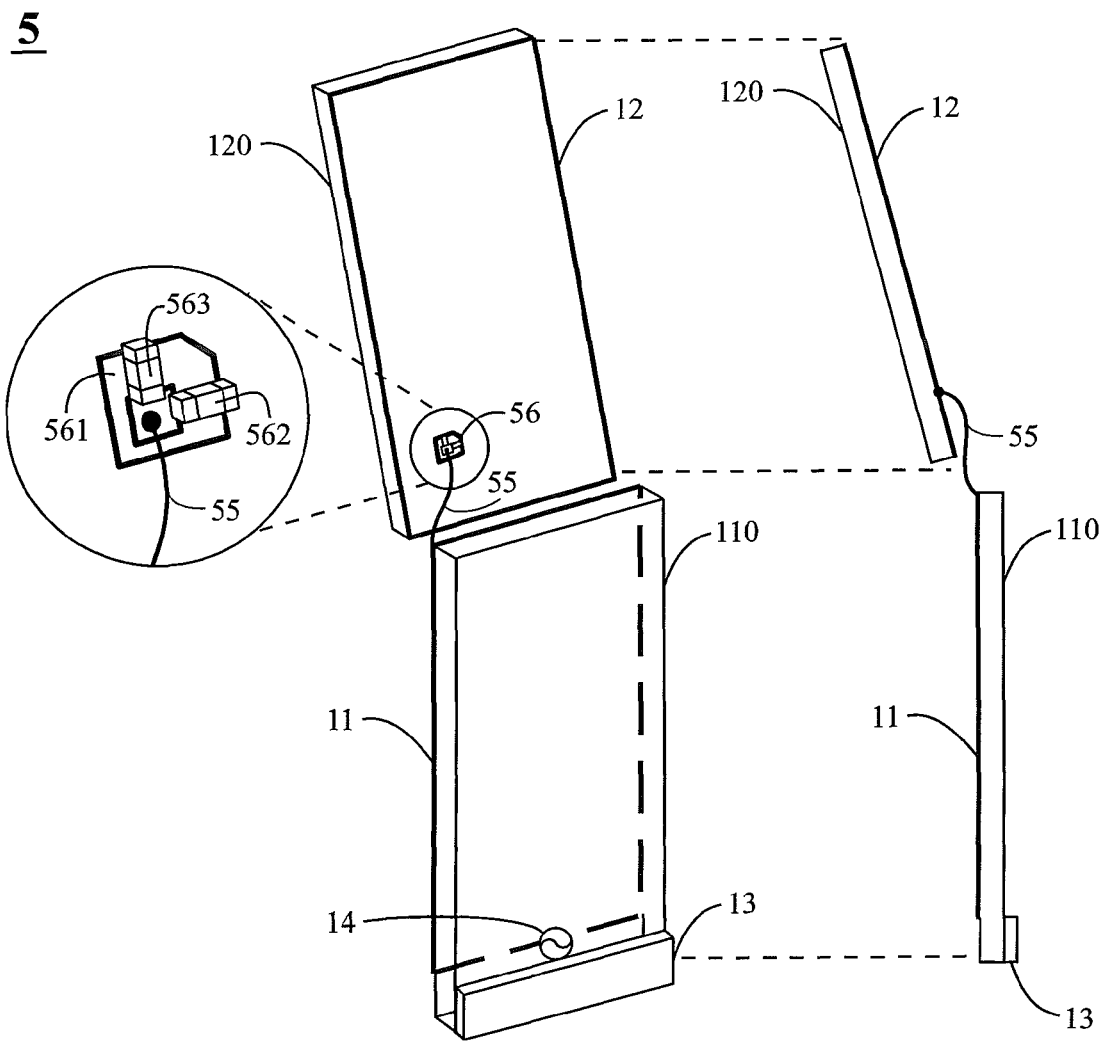
FIG. 5 illustrates a structural view of a folder-type mobile communication device in a fourth embodiment of the present invention.

Please refer to FIG. 5, which illustrates a structural view of a folder-type mobile communication device in a fourth embodiment of the present invention. The folder-type mobile communication device 5 comprises a first dielectric substrate 110, a first ground plane 11, an antenna element 13, a second dielectric substrate 120, a second ground plane 12, a metal line 55, and a band-stop circuit 56.

The major differences between the structure of the folder-type mobile communication device 5 of the fourth embodiment and that of the first embodiment are as follows: The band-stop circuit 56 is located within the second ground plane 12, and is connected to the first ground plane 11 through the metal line 55; further, the slit 561 of the band-stop circuit 56 is an annular slot without any open end. With such a structure, the effect of the fourth embodiment is similar to that of the first embodiment. Therefore, the fourth embodiment is also capable of generating results similar to those of the first embodiment.

It is noted that the above-mentioned embodiments are only for illustration. It is intended that the present invention covers modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A folder-type mobile communication device, comprising:
    a first dielectric substrate;
    a first ground plane, disposed on a surface of the first dielectric substrate;
    an antenna element, located near the first ground plane, electrically connected to a signal source on the first dielectric substrate;
    a second dielectric substrate;
    a second ground plane, disposed on a surface of the second dielectric substrate;
    a metal line, wherein the second ground plane is electrically connected to the first ground plane through the metal line; and
    a band-stop circuit, located either on the first ground plane or on the second ground plane, the band-stop circuit including:
        a slit, located near the metal line;
        a capacitive element, arranged across the slit, wherein two ends of the capacitive element are respectively electrically connected to two sides of the slit; and
        an inductive element, arranged across the slit, wherein two ends of the inductive element are respectively electrically connected to two sides of the slit, such that the inductive element and the capacitive element form a parallel LC resonant circuit, and the band-stop circuit generates a parallel resonance at a specified frequency.

2. The folder-type mobile communication device as claimed in claim 1, wherein the specified frequency is at about 900 MHz.

3. The folder-type mobile communication device as claimed in claim 1, wherein the slit comprises two open ends.

4. The folder-type mobile communication device as claimed in claim 1, wherein the slit is U-shaped.

5. The folder-type mobile communication device as claimed in claim 4, wherein the band-stop circuit is located on one side of either the first ground plane or the second ground plane.

6. The folder-type mobile communication device as claimed in claim 1, wherein the slit is L-shaped.

7. The folder-type mobile communication device as claimed in claim 6, wherein the band-stop circuit is located on one corner of either the first ground plane or the second ground plane.

8. The folder-type mobile communication device as claimed in claim 1, wherein the slit is an annular slot.

9. The folder-type mobile communication device as claimed in claim 8, wherein the band-stop circuit is located within either the first ground plane or the second ground plane.

10. The folder-type mobile communication device as claimed in claim 1, wherein the capacitive element is a chip capacitor, and the inductive element is a chip inductor.

* * * * *